Nov. 10, 1959  E. A. O'NEAL  2,912,275

DUAL SUN VISOR BRACKET AND ASSEMBLY

Filed Nov. 26, 1957

INVENTOR
Everett A. O'Neal
BY
Dybvig and Jacox
HIS ATTORNEYS

United States Patent Office 2,912,275
Patented Nov. 10, 1959

2,912,275

DUAL SUN VISOR BRACKET AND ASSEMBLY

Everett A. O'Neal, Greenville, Ohio

Application November 26, 1957, Serial No. 699,057

3 Claims. (Cl. 296—97)

This invention relates to a dual sun visor bracket and assembly. The invention relates more particularly to a dual sun visor assembly adapted for attachment within a motor vehicle.

This application is a continuation-in-part of my co-pending application, Serial No. 530,838, filed on August 26, 1955, now abandoned.

In the art of motor vehicles, it is common practice to provide a sun visor or sun shield pivotally and adjustably supported within the vehicle for the use of the driver and/or passengers of the vehicle. However, it is well known that it is often very difficult to shield persons within the vehicle from the sun's rays due to the fact that the rays of the sun may enter the vehicle at various angles as the vehicle travels.

Therefore, a problem has existed in providing visor means which shield at more than one angle against the rays of the sun. It has been found that in a present day motor vehicle it is often necessary to frequently adjustably and pivotally move a visor or sun shield within the vehicle in order to protect the person's eyes from the rays of the sun as the vehicle changes directions of travel.

Hence, an object of this invention is to provide a sun visor assembly which by one adjustment thereof shields at more than one angle against the sun's rays.

Another object of this invention is to provide a dual sun visor assembly in which two sun visors may be disposed in juxtaposed parallel relation or may be disposed in angular relation.

Another object of this invention is to provide a dual sun visor assembly which is easily and readily attached to a conventional motor vehicle.

Another object of this invention is to provide a dual sun visor assembly in which both of the sun visors are fully adjustable throughout the same angular range so that the visors may be nested together at a plurality of positions.

Other objects and advantages reside in the construction of parts, the combination thereof and the mode of operation, as will become more apparent from the following description.

Figure 1:
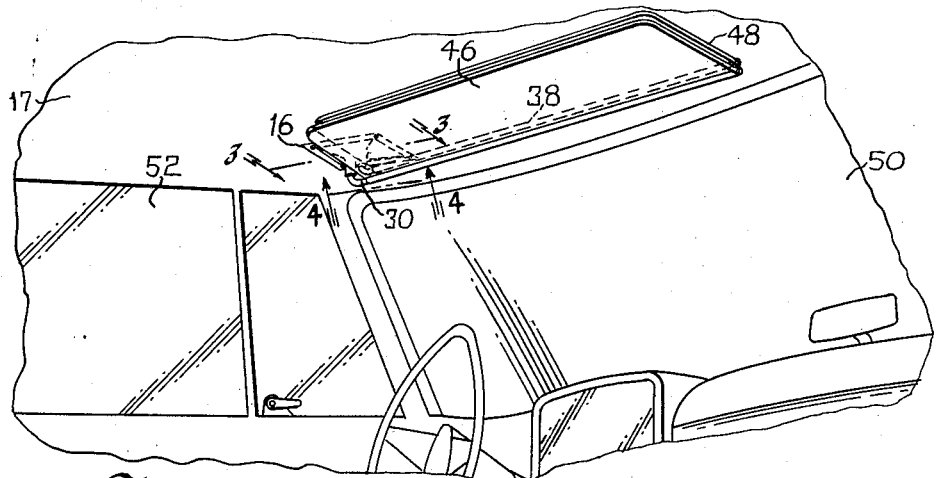
Figure 1 is a perspective view of a dual sun visor bracket and assembly of this invention within a motor vehicle showing the two sun visors nested in juxtaposed relation adjacent the roof of the vehicle.
Figure 2:
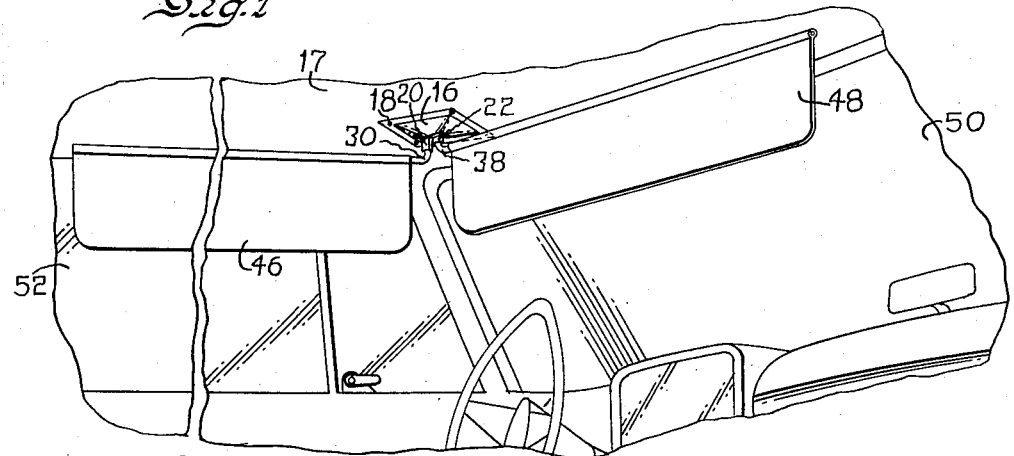
Figure 2 is a perspective view showing a dual sun visor bracket and assembly of this invention mounted within a vehicle showing the two visor members disposed in angular relation one with respect to the other.

Referring to the drawings in detail, a dual sun visor bracket and assembly of this invention comprises a bracket or support plate 16 adapted to be attached to a roof or upper portion 17 of the interior of a motor vehicle, as best shown in Figures 1 and 2. The bracket 16 may be attached by any suitable means such as by a plurality of screws 18.

Figure 3:
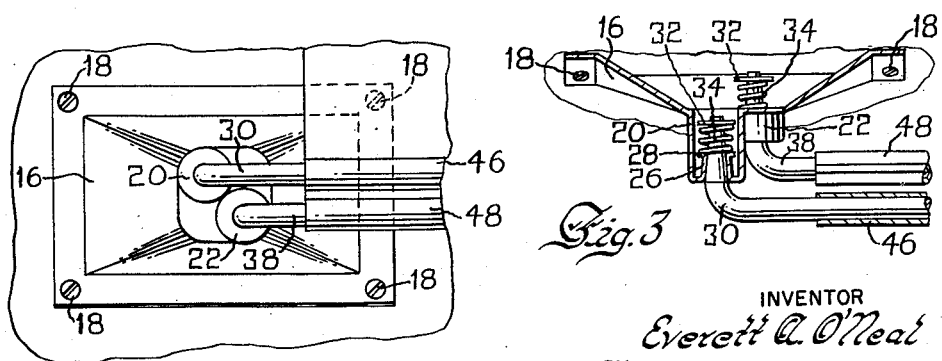
Figure 3 is an enlarged sectional view taken substantially on line 3—3 of Figure 1.

The bracket 16 is provided with downwardly sloping side plates terminating in protuberances or bearing housings 20 and 22 at the central portion thereof. As best shown in Figure 3, the protuberance 20 is longer than the protuberance 22.

Figure 4:
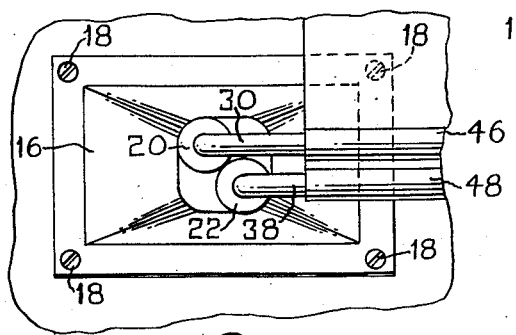
Figure 4 is an enlarged fragmentary view taken substantially on line 4—4 of Figure 1.

As shown in Figure 4, the protuberances are offset. Also, the plate 16 is so positioned within the vehicle that one of the protuberances is to the side and rearwardly of the other protuberance.

Each of the protuberances 20 and 22 has a tubular member 26 disposed therewithin concentric therewith and extending substantially upwardly from the lower edge of the protuberance, as shown in the protuberance 20 in Figure 3.

Rotatably disposed within the tubular member 26 of the protuberance 20 is a rod member 30. The end of the rod member 30 extends substantially upwardly from the tubular member 26 and has a disc 32 attached thereto adjacent the end thereof. A helical spring 34 is compressed between the disc 32 and a collar 28 of the tubular member 26. The spring 34 thus urges the rod member 30 upwardly within the tubular member 26. The tubular member 26 and the portion of the rod 30 therewithin are shown as being slightly tapered so that the rod 30 is thus rotatably movable and firmly journalled within the tubular member 26.

A rod 38 is carried within the protuberance 22 in a manner similar to the attachment of the rod 30 within the protuberance 20. The rod 38 also has a disc 32 and a spring 34 at the end thereof for retaining the position of the rod 38.

Each of the rods 30 and 38 is somewhat right angular in shape so that a shorter portion is carried within one of the protuberances 20 or 22 and a longer portion of each of the rods 30 and 38 extends substantially horizontally therefrom.

Pivotally attached to the longer portion of the rod 30 is a visor 46. Pivotally attached to the longer portion of the rod 38 is a visor 48.

Each of the rods 30 and 38 is identical in shape and in length. Due to the fact that the protuberance 20 is longer than the protuberance 22, thus positioning the rod 30 at a lower level than the rod 38, the rods 30 and 38 and the visors 46 and 48 may be readily disposed in juxtaposed relation at various positions thereof. The visors 46 and 48 may be in juxtaposed relation at positions substantially normal to the line of travel of the vehicle, as shown in Figure 1, or the visors 46 and 48 may be substantially parallel to the line of travel of the vehicle in the manner in which the visor 46 is disposed in Figure 2.

When the visors 46 and 48 are so juxtaposed, they may both be in substantially horizontal planes, as shown in Figure 1, or the visors 46 and 48 may both be in substantially vertical planes. Furthermore, when the rod members 30 and 38 are in juxtaposed relation, one of the visor members 46 or 48 may be in a substantially horizontal plane while the other visor member is disposed in a substantially vertical plane.

In order to obtain greatest shielding, the visor 48 is positioned adjacent a windshield 50 and the visor 46 is positioned adjacent a side window 52, in the manner shown in Figure 2. Thus, a person within the vehicle is well shielded from the sun's rays, the person being shielded at more than one angle.

With the rods 30 and 38 positioned as shown in Figure 2, the visors 46 and/or 48 may be moved to a horizontal position along the width thereof if shielding is not required.

Thus, it is understood that the sun visor bracket and assembly of this invention has rod members and visors thereof which may be adjusted to a plurality of positions for the use thereof or for lodging thereof when not in use.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a sun shield assembly, a plate adapted to be attached substantially horizontally to the upper portion of the interior of an automobile adjacent a windshield and a side window thereof, a pair of substantially vertical spaced-apart cylindrical protuberances carried by the plate and extending from the lower surface thereof, one of the protuberances being longer than the other protuberance, the protuberances being offset so that one of the protuberances is closer to the windshield and the other protuberance is closer to the side window, a bearing member within each cylindrical protuberance concentric therewith, a pair of visors, a pair of angularly formed rod members, each of the rod members having an upwardly extending portion rotatably carried within one of the bearing members so that an end of the rod member is above the bearing member, each of the rod members also having a horizontal portion to which one of the visors is pivotally attached.

2. A support assembly for carrying sun shade members at the upper portion of the interior of an automobile comprising a plate having side edges and a central portion, the plate having inclined portions joining the side edges to the central portion, the side edges being secured to an upper interior surface of the automobile so that there is a cavity formed by the inclined portions and central portion and the interior surface, a pair of cylindrical, spaced-apart, parallel, hollow bearing housings extending from the central portion of the plate normal thereto, one of the bearing housing extending further from the plate than the other bearing housing, a pair of bearing members, there being one bearing member carried within each bearing housing, a pair of visor members, a pair of substantially L-shaped rods, each of the L-shaped rods having a short portion rotatably carried by one of the bearing members, the short portion of at least one of the rods extending into said cavity formed by the inclined portions and the central portion and the interior surface, the other portion of each of the rods having one of said visor members pivotally attached thereto.

3. In a sun shield assembly, a bracket adapted to be attached within an automobile to the upper portion thereof adjacent a windshield and a side window thereof, a pair of spaced-apart housing members carried by the bracket nad extending therefrom, one of the housing members being longer and extending from the bracket farther than the other housing member, the housing members being somewhat offset so that one of the housing members is closer to the windshield and the other housing member is closer to said side window, a pair of bearing members, there being one bearing member within each housing member, a pair of visors, a pair of angularly formed rod members, each rod member having an upwardly extending portion and a substantially horizontal portion, a part of the upward extending portion of each rod member being rotatably disposed in one of the bearing members, the horizontal portion of each of the rod members pivotally supporting one of said visors.

References Cited in the file of this patent

UNITED STATES PATENTS

| | | |
|---|---|---|
| 417,959 | Welton | Dec. 24, 1889 |
| 1,547,860 | Dangerfield | July 28, 1925 |
| 1,599,183 | Phillips | Sept. 7, 1926 |
| 2,112,464 | Jacobs | Mar. 29, 1938 |
| 2,634,161 | Beets | Apr. 7, 1953 |